United States Patent [19]

Jones

[11] Patent Number: 4,672,751
[45] Date of Patent: Jun. 16, 1987

[54] CHAIN ALIGNMENT TOOL

[76] Inventor: J. D. Jones, 1211 Kwis Ave., Hacienda Heights, Calif. 91745

[21] Appl. No.: 888,414

[22] Filed: Jul. 23, 1986

[51] Int. Cl.⁴ .............................................. G01B 5/24
[52] U.S. Cl. ...................................... 33/286; 33/202; 33/533
[58] Field of Search ................ 33/180 R, 182, 203.18, 33/203.19, 203.2, 203.21, 203, 181 R, 180 AT, 181 AT, 412, 533, 288, 264, 263, 286

[56] References Cited

U.S. PATENT DOCUMENTS

| | | | |
|---|---|---|---|
| 591,277 | 10/1897 | Johnston | 33/533 |
| 2,479,963 | 8/1949 | Pfersick | 33/412 |
| 2,714,255 | 8/1955 | Glazer | 33/286 |
| 2,815,582 | 12/1957 | Karstens | 33/533 X |
| 4,096,636 | 6/1978 | Little | 33/203 |
| 4,212,111 | 7/1980 | Saari | 33/181 AT |
| 4,216,587 | 8/1980 | Stone | 33/412 X |
| 4,413,415 | 11/1983 | Stovall | 33/412 |
| 4,502,233 | 3/1985 | Boitz et al. | 33/412 |
| 4,608,760 | 9/1986 | Franks | 33/288 |

Primary Examiner—William D. Martin, Jr.
Attorney, Agent, or Firm—Edgar W. Averill, Jr.

[57] ABSTRACT

A chain alignment tool to assist the alignment of a chain sprocket with respect to its chain. The tool is placed over a sprocket at a point where its chain tangentially contacts the sprocket. The tool is tightened against the sprocket and becomes aligned with the sprocket. The tool has an attached pointer which extends outwardly in a direction parallel to the surface of the sprocket. The end of the pointer should align with the chain if the chain is in alignment with the sprocket.

11 Claims, 5 Drawing Figures

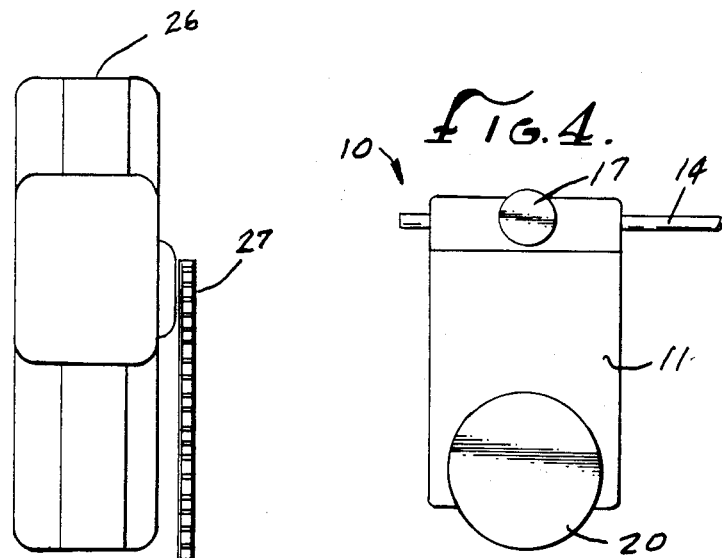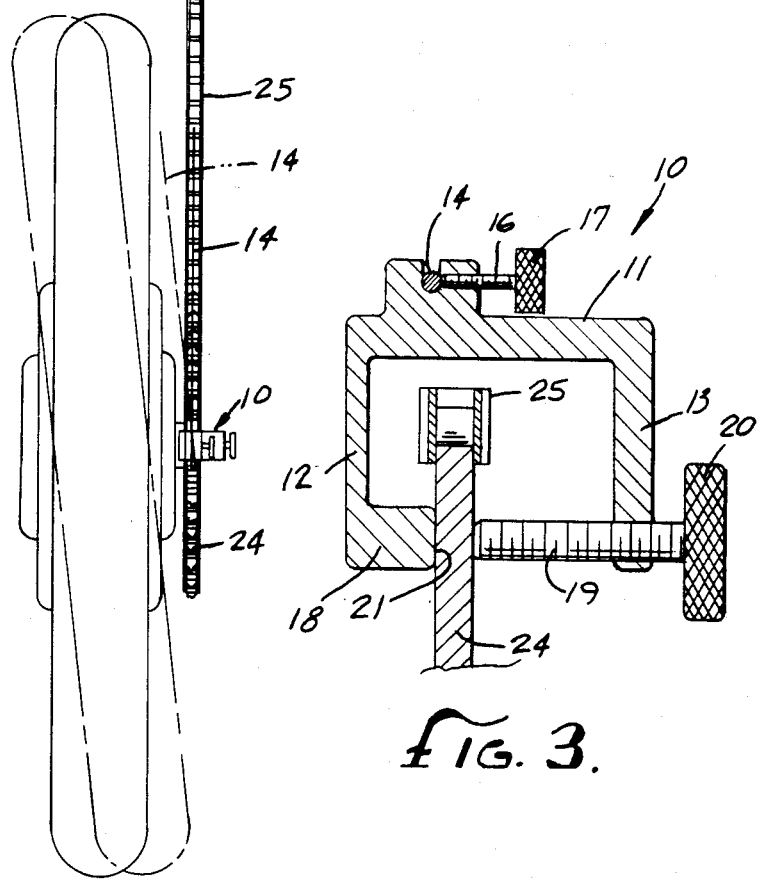

4,672,751

CHAIN ALIGNMENT TOOL

BACKGROUND OF THE INVENTION

The field of the invention is tools and the invention relates more particularly to tools useful in adjusting sprockets of the type which are driven by a chain.

Numerous machines are driven by sprockets affixed to chains or drive belts. Perhaps the most widespread and visable use of such chains would be in conjunction with motorcycles and bicycles. In order to maximize the power transmitted between the chain and the sprocket and to minimize the wear both on the chain and the sprocket, it is beneficial that the chain be in direct alignment with the sprocket. Typically, the sprocket is not sufficiently large so that this alignment can be readily done visably. Most often the sprocket is aligned, however, by sight and the results are often imperfect.

SUMMARY OF THE INVENTION

It is an object of the present invention to provide a tool for facilitating the alignment of a chain sprocket with respect to its chain.

The present invention is for a chain alignment tool to assist in the aligning of a chain sprocket with respect to its chain. The tool has a tool body, having a longitudinal opening defined by two downwardly extending arms. The first of the two arms has an inwardly protruding sprocket-contacting extension. The second of the two arms has an extendable clamp held by the second arm. The extendable clamp includes means for moving the same toward and away from the sprocket-contacting extension and the clamp is in horizontal alignment with the sprocket-contacting extension. A pointer is held by the tool body and extends outwardly therefrom in a direction parallel to the surface of the sprocket-contacting extension and directly above the longitudinal opening. The expandable clamp may thus be opened and the tool body opening placed over a chain supporting sprocket at the point where the chain is tangential to the sprocket. The extendable clamp is then closed to hold the sprocket-contacting extension against one surface of the sprocket and to cause the pointer to extend in a parallel manner to the surface of the sprocket. This indicates the proper line of direction of the chain. Preferably, the extendable clamp is a threaded shaft held by a threaded opening in the second arm of the tool body. The tool body may be readily fabricated from extruded aluminum and the pointer may be adjustably held to the tool body.

BRIEF DESCRIPTION OF THE DRAWINGS

FIG. 3 is a cross-sectional view taken along line 3—3 of FIG. 2.

FIG. 4 is a side view thereof.

FIG. 5 is a top view taken along line 5—5 of FIG. 2 and further showing a wheel in phantom lines and an engine.

DESCRIPTION OF THE PREFERRED EMBODIMENTS

Figure 1:
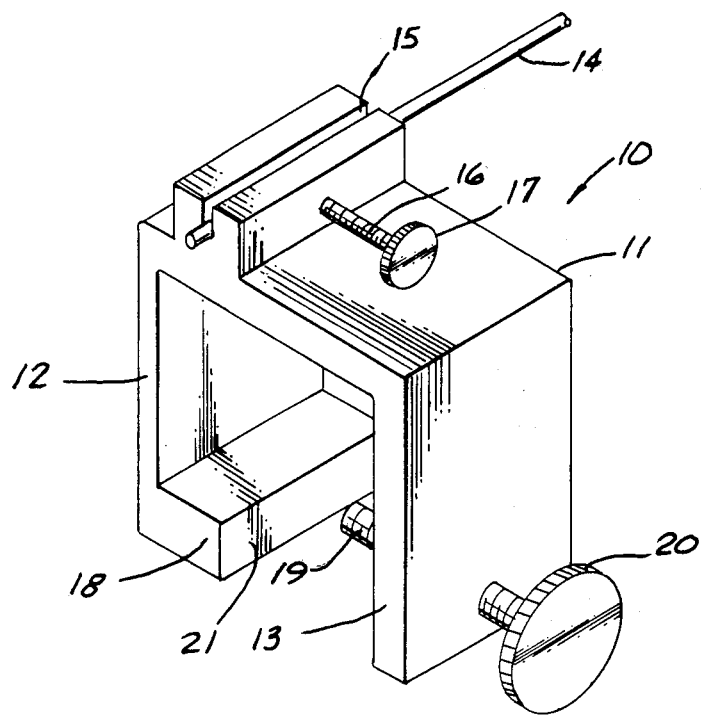
FIG. 1 is a perspective view of the chain alignment tool of the present invention.

A chain alignment tool is shown in perspective view in FIG. 1 and indicated by reference character 10. Chain alignment tool 10 has a tool body 11 which has a first downwardly extending arm 12 and a second downwardly extending arm 13. A pointer 14 is adjustably held in a groove 15 by a set screw 16 which is adjusted by knob 17. Set screw 16, of course, is held in a threaded opening in the tool body 11.

The first downwardly extending arm has a sprocket-contacting extension comprising a ridge 18 which is adapted to contact one surface of a sprocket as explained in more detail below. The second downwardly extending arm supports an extendable clamp comprising a threaded shaft 19 which may be easily tightened or loosened by turning knob 20. Again, threaded shaft 19 is held by a threaded opening, not shown, in the second downwardly extending arm 13.

The sprocket and associated chain is shown in FIG. 3 to indicate the attachment of the device. This attachment is further clarified by FIGS. 2 and 5 discussed below.

Figure 2:
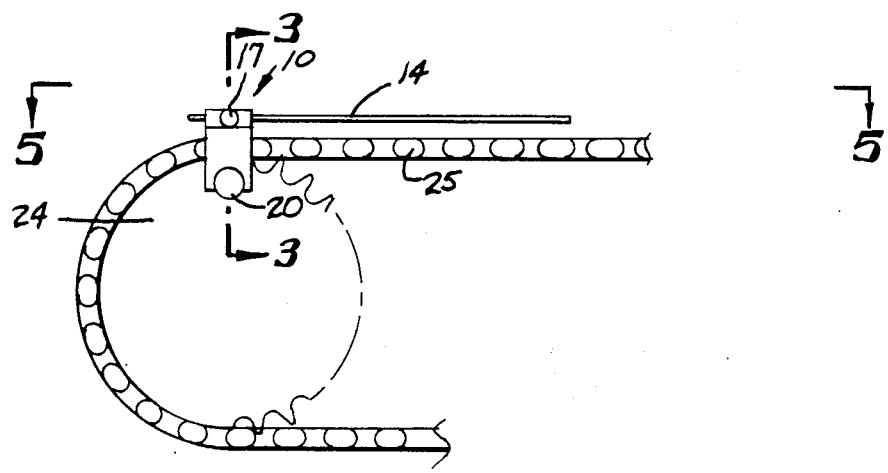
FIG. 2 is a side view of the tool of FIG. 1 shown attached to a chain supporting sprocket.

The tool is shown in side view in FIG. 2 where it can be seen that the pointer extends outwardly a substantial distance from the tool body. This increases the sensitivity of the tool. From FIG. 4, it can also be seen that knob 17 and 20 are located near the midpoint of the tool body 11.

A cross-sectional view of the tool is shown in FIG. 3 which also indicates the chain and sprocket. It can be seen that ridge 18 has a contact surface 21 which is in horizontal alignment with threaded shaft 19. In this way, the tool 10 may be securely held against the opposing surfaces of a sprocket in a manner which assures alignment of the pointer 14 with the proper location of the chain. It can also be seen that the vertical plane which intersects contact surface 21 also intersects pointer 14, thereby causing the pointer to lie directly over the inner edge of the chain.

The attachment of the tool to a chain supporting sprocket is shown in FIGS. 2 and 3 where sprocket 24 supports a chain 25. In order to align the sprocket with respect to the chain, tool 10 is placed over the chain by unscrewing knob 20 and bringing contact surface 21 in contact with the back side of sprocket 24 as viewed in FIG. 3. Knob 20 is then turned to tighten threaded shaft 19 against the front surface of sprocket 24.

Before final tightening, tool 10 may be turned slightly to position pointer 14 close to chain 25. As shown best in FIG. 5, pointer 14 lies parallel to chain 25 when the sprocket is correctly aligned with respect to the chain. The position of the sprocket, of course, is adjusted by turning the wheel or other device to which it is mounted into proper alignment as indicated in FIG. 5 which also shows the engine 26 and sprocket 27.

The chain alignment tool of the present invention may be readily fabricated from extruded aluminum or plastic. It is, of course, possible that the pointer be permanently affixed to the tool but, in practice, it is preferable that the pointer be removable for possible straightening if necessary. Also because of the size and accessibility of the chain by providing the pointer with means for adjustment, the tool can be used in a wider variety of applications. While the pointer in the drawings is shown as a thin, cylindrical rod, a flat bar could alternatively be used. While a smooth ridge is shown in the drawings, a pair of pins or other extension could alternatively be used. The tool is not limited to chain alignment, but is also useful for belt and pulley alignment.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

What is claimed is:

1. A chain alignment tool to assist in the aligning of a chain sprocket with respect to its chain, said tool comprising:

a tool body having a longitudinal opening defined by two downwardly extending arms, the first of said two arms having an inwardly protruding sprocket-contacting extension and the second of said two arms having an extendable clamp held thereby, said extendable clamp including means for moving the same toward and away from said sprocket-contacting extension and said clamp being in horizontal alignment with said sprocket-contacting extension; and a pointer held by said tool body and extending outwardly therefrom in a direction parallel to the surface of said sprocket-contacting extension and directly above the longitudinal opening, whereby the extendable clamp may be opened and the tool body opening placed over a chain-supporting sprocket and the extendable clamp closed to hold the sprocket-contacting extension against the sprocket and to cause the pointer to extend parallel to the surface of the sprocket thereby indicating the proper line of direction of the chain.

2. The chain alignment tool of claim 1 wherein the pointer is adjustably held to said tool body by a pointer clamp.

3. The chain alignment tool of claim 2 wherein the pointer is held by a threaded set screw abutting against the side of said pointer.

4. The chain alignment tool of claim 1 wherein the extendable clamp member has a threaded shaft held by a threaded opening in the second of said arms.

5. The chain alignment tool of claim 4 wherein the extendable clamp has an enlarged knob to facilitate the tightening and loosening thereof.

6. The chain alignment tool of claim 1 wherein the pointer is a cylindrical rod.

7. The chain alignment tool of claim 1 wherein the tool body is an extruded aluminum tool body.

8. The chain alignment tool of claim 7 wherein the sprocket-contacting extension is an inwardly extending ridge formed at the base of said first arm.

9. A chain alignment tool to assist in the aligning of a chain sprocket with respect to its chain, said tool comprising:

an extruded aluminum tool body having a longitudinal opening defined by two downwardly extending arms, the first of said two arms having an inwardly protruding sprocket-contacting ridge and the second of said two arms having an extendable clamp held thereby, said extendable clamp including means for moving the same toward and away from said sprocket-contacting ridge and said clamp being in horizontal alignment with said sprocket-contacting ridge and near the longitudinal midpoint thereof; and a pointer held by said tool body and extending outwardly therefrom in a direction parallel to the surface of said sprocket-contacting ridge and directly above the longitudinal opening, whereby the extendable clamp may be opened and the tool body opening placed over a chain-supporting sprocket and the extendable clamp closed to hold the sprocket against the sprocket contacting ridge and to cause the pointer to extend parallel to the surface of the sprocket thereby indicating the proper line of direction of the chain.

10. The chain alignment tool of claim 9 wherein the pointer is adjustably held in an opening formed near the top of said tool body.

11. The chain alignment tool of claim 10 wherein the pointer is a cylindrical rod and is held in said opening by a set screw held by the tool body.

* * * * *